United States Patent
Haiut et al.

(10) Patent No.: US 9,043,211 B2
(45) Date of Patent: May 26, 2015

(54) LOW POWER ACTIVATION OF A VOICE ACTIVATED DEVICE

(71) Applicant: DSP Group LTD., Herzeliya (IL)

(72) Inventors: Moshe Haiut, Ramat Gan (IL); Arie Heiman, Sde Warburg (IL); Uri Yehuday, Bat Yam (IL)

(73) Assignee: DSP GROUP LTD., Herzeliya (IL)

( * ) Notice: Subject to any disclaimer, the term of this patent is extended or adjusted under 35 U.S.C. 154(b) by 0 days.

(21) Appl. No.: 14/272,544

(22) Filed: May 8, 2014

(65) Prior Publication Data

US 2014/0337036 A1    Nov. 13, 2014

Related U.S. Application Data

(60) Provisional application No. 61/821,244, filed on May 9, 2013.

(51) Int. Cl.
| | |
|---|---|
| *G10L 15/20* | (2006.01) |
| *G10L 15/28* | (2013.01) |
| *G06F 1/32* | (2006.01) |
| *G06F 3/16* | (2006.01) |
| *G10L 25/78* | (2013.01) |

(52) U.S. Cl.
CPC ............... *G10L 15/20* (2013.01); *G10L 15/28* (2013.01); *G06F 1/3265* (2013.01); *G06F 3/167* (2013.01); *G10L 25/78* (2013.01)

(58) Field of Classification Search
CPC ...... G10L 15/22; G10L 15/265; G06F 1/3203
USPC .......................................... 704/275, 251, 270
See application file for complete search history.

(56) References Cited

U.S. PATENT DOCUMENTS

| | | | | | |
|---|---|---|---|---|---|
| 5,983,186 | A | * | 11/1999 | Miyazawa et al. | 704/275 |
| 6,070,140 | A | * | 5/2000 | Tran | 704/275 |
| 6,756,700 | B2 | * | 6/2004 | Zeng | 307/112 |
| 7,519,703 | B1 | * | 4/2009 | Stuart et al. | 709/224 |
| 7,720,683 | B1 | * | 5/2010 | Vermeulen et al. | 704/254 |
| 2009/0312658 | A1 | * | 12/2009 | Thieberger et al. | 600/520 |
| 2011/0301729 | A1 | * | 12/2011 | Heiman et al. | 700/94 |
| 2013/0085755 | A1 | * | 4/2013 | Bringert et al. | 704/235 |
| 2013/0289994 | A1 | * | 10/2013 | Newman et al. | 704/254 |
| 2014/0156269 | A1 | * | 6/2014 | Lee et al. | 704/231 |

* cited by examiner

*Primary Examiner* — Vincent P Harper
(74) *Attorney, Agent, or Firm* — Oren Reches

(57) ABSTRACT

In a mobile device, a bone conduction or vibration sensor is used to detect the user's speech and the resulting output is used as the source for a low power Voice Trigger (VT) circuit that can activate the Automatic Speech Recognition (ASR) of the host device. This invention is applicable to mobile devices such as wearable computers with head mounted displays, mobile phones and wireless headsets and headphones which use speech recognition for the entering of input commands and control. The speech sensor can be a bone conduction microphone used to detect sound vibrations in the skull, or a vibration sensor, used to detect sound pressure vibrations from the user's speech. This VT circuit can be independent of any audio components of the host device and can therefore be designed to consume ultra-low power. Hence, this VT circuit can be active when the host device is in a sleeping state and can be used to wake the host device on detection of speech from the user. This VT circuit will be resistant to outside noise and react solely to the user's voice.

15 Claims, 17 Drawing Sheets

LOW POWER ACTIVATION OF A VOICE ACTIVATED DEVICE

RELATED APPLICATIONS

This application claims the benefit of U.S. provisional patent Ser. No. 61/821,244 having a filing date of May 9, 2013 which is incorporated herein by reference.

FIELD OF THE INVENTION

This invention relates to the field of Voice Trigger (VT) as used in many mobile electronic devices associated with the use of Automatic Speech Recognition (ASR) for the entering of voice input commands and control.

BACKGROUND OF THE INVENTION

Many electronic voice activated devices use Automatic Speech Recognition (ASR) technology as a means for entering voice commands and control phrases. For example, users may operate the Internet browser on their mobile device by speaking audio commands. The voice activation includes a Voice Trigger (VT) detection process and an ASR process.

Voice trigger is used to detect that a specific audio command may have been uttered and then the ASR process the speech.

In order to respond to the user command or request, the ASR engine needs to be always active which is an issue as power consumption is a critical parameter in mobile devices.

Once the VT detects that the user has spoken a predefined phrase the ASR engine will be activated to analyze the user's commands and then, if recognized, follow the predefined action.

A major issue with the ASR engine is that it is continuously active, waiting for a user's vocal command. The ASR process may be executed by the ASR engine only upon a positive output from the VT process but because it is always active, the Voice Trigger (VT) process can consume significant processing power and thus negatively impact battery life and power consumption. A second issue with the ASR is that it can generate significant false detections by detecting a second talker or ambient noise.

There are many techniques for VT and most of them simply detect the presence of audio. This audio is not necessarily the user's speech and can be ambient noise or a second talker that is nearby, for examples. These other audio signals can generate false detection causing excessive power consumption and poor user experience.

It is common practice for the VT process to use the same input voice channel as used by the ASR process, for example the voice microphone and amplification circuitry. Having the voice channel active and running simply to serve the VT process requires significant power consumption, almost the same level that is required for running the speech recognition. This is especially true for very low power systems where the digital signal processor (DSP) processing power has been optimized. Power consumption of mobile devices is a very important part of the design and this present invention seeks to provide superior power saving while also maintaining and improving the performance. For example, when used in a noisy environment, the use of the microphone circuitry results in many spurious triggers of the speech recognition process and results in excessive use of power consumption.

SUMMARY OF THE INVENTION

According to an embodiment of the invention there may be provide a voice activated device, may include a voice trigger circuit, an automatic speech recognition circuit; wherein the voice trigger circuit may be arranged to receive first detection signals from a first sensor and to trigger an activation of the automatic speech recognition circuit in response to a detection of a voice trigger, while the automatic speech recognition device is in a first power mode; wherein the automatic speech recognition circuit may be arranged to detect, while operating in a second power mode, an audio activation command; wherein a power consumption of the automatic speech recognition circuit when operating in the second power mode exceeds a power consumption of the automatic speech recognition when operating in the first power mode; and wherein the first sensor is a bone conduction sensor or a vibration sensor.

The voice activated device may include the first sensor.

The automatic speech recognition circuit may be arranged to be idle or deactivated when in the first power mode.

The voice activated device may include a display, wherein the first sensor is a vibration sensor that is connected to the display.

The voice activated device may include a buffer that may be arranged to receive audio samples from an audio sensor and to store the audio samples, wherein the automatic speech recognition circuit, after being activated, may be arranged to retrieve the audio samples; wherein at least some audio samples are received by the buffer when the automatic speech recognition device is in the first power mode.

The activated device may include the audio sensor.

The automatic speech recognition circuit may be arranged to detect the audio activation command in response to audio samples provided by an audio sensor and in response to the first detection signals.

The voice trigger circuit is further arranged to receive audio samples from an audio sensor and to detect the voice trigger in response to the first detection signals and the audio samples.

The voice trigger circuit may be arranged to activate an audio sensor if the first detection signals are indicative of a potential voice trigger; and to verify the voice trigger if audio samples generated by the audio sensor are indicative of the voice trigger.

The voice activated device may include a bone conduction sound generator that may be arranged to feed the bone conductor sensor with sound signals to be converted to vibrations by the bone conductor sensor.

The voice activated device may include a second sensor, wherein the first and second sensors may include the vibration sensor and the bone conduction sensor.

The voice activated device may include a controller and a set of detectors, wherein the set of detectors may include the first detector, wherein the controller may be arranged to determine which sub-set of detector to activate when the automatic speech recognition device is in the first power mode, in response to an expected power consumption associated with an activation of the sub-set of detectors.

The voice activated device wherein the controller may be arranged to determine which sub-set of detectors to activate in response to a previous voice trigger detections and automatic speech recognition detections.

According to an embodiment of the invention there may be provided a voice activated device, that may include a first sensor; a signal processor; wherein the signal processor may be arranged to receive first detection signals from the first sensor and to detect a voice trigger when operating in a first power mode; upon a detection of the voice trigger enter a second power mode and detect, by applying automatic speech recognition, an audio activation command; wherein a power consumption of the signal processor when operating in the second power mode exceeds a power consumption of the signal processor when operating in the first power mode; and wherein the first sensor is a bone conduction sensor or a vibration sensor.

According to an embodiment of the invention there may be provided a method for activating a voice activated device, the method may include generating by a first sensor first detection signals; wherein the first sensor is a bone conduction sensor or a vibration sensor; detecting a voice trigger in response to the first detection signals; triggering an automatic speech recognition process in response to the detecting of the voice trigger; detecting, by the automatic speech recognition process, an audio activation command; and deactivating the speech recognition process; wherein a power consumption associated with the automatic speech recognition process exceeds a power consumption associated with the detecting of the voice trigger.

The is executed by a voice trigger circuit while an automatic speech recognition circuit is in a first power mode; the detecting of the audio activation command is executed by the automatic speech recognition when operating in a second power mode; and a power consumption of the automatic speech recognition circuit when operating in the second power mode exceeds a power consumption of the automatic speech recognition when operating in the first power mode.

The method may include buffering audio samples from an audio sensor; wherein at least some audio samples are buffer prior to the triggering of the automatic speech recognition process; and processing the audio samples by the automatic speech recognition process.

The method wherein the automatic speech recognition process is responsive to audio samples provided by an audio sensor and to the first detection signals.

The voice trigger circuit is further arranged to receive audio samples from an audio sensor and to detect the voice trigger in response to the first detection signals and the audio samples.

The voice trigger circuit may be arranged to activate an audio sensor if the first detection signals are indicative of a potential issuance of a voice trigger; and to verify the voice trigger if audio samples generated by the audio sensor are indicative of the voice trigger.

According to an embodiment of the invention there may be provide a kit that may include a voice trigger circuit and an automatic speech recognition circuit. The voice trigger circuit may be arranged to receive first detection signals from a first sensor and to trigger an activation of the automatic speech recognition circuit in response to a detection of a voice trigger, while the automatic speech recognition device is in a first power mode; wherein the automatic speech recognition circuit may be arranged to detect, while operating in a second power mode, an audio activation command; wherein a power consumption of the automatic speech recognition circuit when operating in the second power mode exceeds a power consumption of the automatic speech recognition when operating in the first power mode; and wherein the first sensor is a bone conduction sensor or a vibration sensor. A kit is any combination of the voice trigger circuit and the automatic speech recognition circuit. Both circuits can be integrated with each other.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
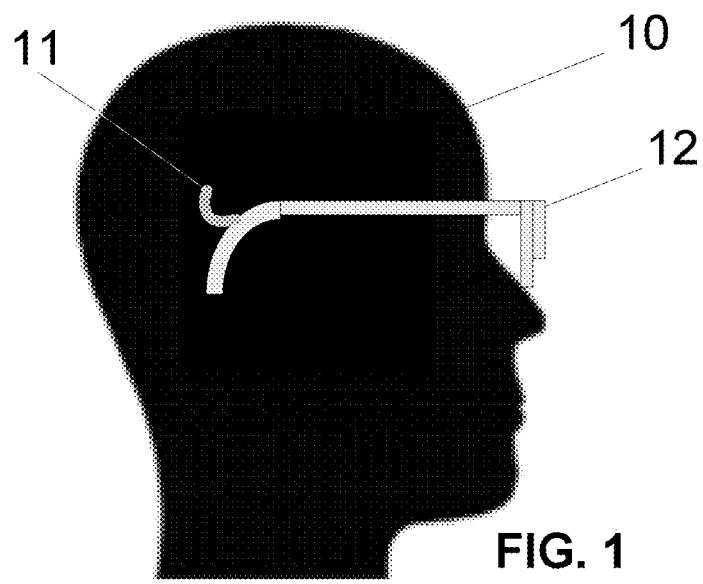
FIG. 1 is a perspective view showing a user wearing a wearable computer with head mounted display according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or kit capable of executing the method.

Any reference in the specification to a device should be applied mutatis mutandis to a method that may be executed by the device or to a kit.

According to various embodiments of the invention there are provided two VT schemes—one that is based on a bone conduction sensor and another that uses a vibration sensor. Both VT schemes are able to detect speech from the user of the device and differentiate it from other surrounding sounds. This enables ultra-low-power implementations of the VT mechanism by the use of devices that independently react to speech vibrations by the user and reject speech signals that may arrive through the air from external sources. This also provides implementations of the VT that are insensitive to the speech of another person or surrounding ambient noise.

According to an embodiment of the invention a bone conduction sensor microphone is used that touches the user's skull. When the user is talking, the sound generated by the user vibrates the skull of the user and these vibrations are captured by the bone conduction sensor.

In another embodiment of the invention a vibration sensor is used to capture the user's speech, for example when the mobile device is held in front of the user's mouth where the sound pressure waves of the user's speech can still be detected. Attaching the vibration sensor to the display of the device, for example, can improve the sensitivity of the vibration sensor in this application. It should be noted that because both the bone conduction sensor and the vibration sensor detect either the bone vibration or the direct sound pressure waves of the user over a short distance, they are both inherently insensitive to the speech of other persons or surrounding ambient noise.

According to an embodiment of the invention using either one of a bone conduction sensor or a vibration sensor for VT purposes may allow to not using the audio components of the host device. The bone conduction sensor (or the vibration sensor) may be the only sensor that is used by the device. The speech recognition algorithm and process, once triggered by the VT, may turn-on alternative hardware audio channel sensors, such as the microphone and audio circuitry.

The bone conduction sensor or the vibration sensor may be used as a simple user speech detector but it may also be used by the speech recognition algorithm for recognition enhancement as an optional audio input path in addition to its main audio path.

Not using the audio channel (that can be in a low power mode during the VT process) can therefore significantly reduce the overall power consumption.

The VT can use, in addition to the bone conduction sensor or the vibration sensor, one or more microphones of the device.

According to an embodiment of the invention the vibration sensor (or bone conduction sensor) is first used to detect if the user is talking and, if so, then the audio microphone or audio microphones are activated, together with processing circuitry such that the speech can be processed accurately using, for example, DSP techniques, and thus provide an analysis of the phrase that was spoken.

According to another embodiment of the invention the vibration sensor (or the bone conduction microphone) and one or more microphones may be used in parallel for VT purposes. This increases the power consumption but may increase the accuracy of the VT process.

It is noted that by using the microphones in the host device, noise cancellation techniques can be used to further provide good analysis of the user's speech in the presence of high background noise.

The use of a bone conduction sensor or a vibration sensor as the input for the VT process allows the microphone and amplification circuitry associated with the voice functions of the device to be kept in an unpowered state until required while allowing the use of an independent, low power circuit for the VT process.

The bone conduction sensor or the vibration sensor will only react to the user's voice and not cause the VT to be activated by other surrounding sounds. This overcomes the problems of using the voice microphone circuitry in a noisy environment, where the VT is continuously being activated by sounds other than the user's voice.

The output (detection signals) of low power VT circuit can be used to wake up the device from a sleep mode. The independent bone conduction or vibration sensor fed low power VT circuit may only react to the user's voice and this ultra-low power independent circuit can be kept active allowing the host device to enter its sleep state.

The vibration sensor can be used to quickly detect the presence of user speech, and then activate an ASR circuit that uses audio microphones, that may or may not be part of the host device, such that the total phrase spoken by the user can be accurately recognized. The audio microphone and ASR circuit may be active either all the time, or under selected operational conditions.

As indicated above a bone conduction sensor or a vibration sensor is used to capture the user's voice and to produce detection signals such as a voltage signal. This voltage signal is then used as the input for a voice trigger circuit which, in turn, is used to activate the ASR circuit.

In applications where the device is held to the ear, such as a smart phone application or the device is worn around the ear, such as a headset or a wearable computer with a head-mounted display, the bone conduction sensor may touch the user's skin, normally above or in front of the ear. Alternatively the bond conduction sensor may be embedded in the device that touches the skull. In all cases the body conduction sensor captures the acoustic bone vibrations when the user speaks.

In applications where the device is held directly in front of the user's mouth, a vibration sensor mounted in the device may be used to detect the direct sound pressure waves of the user. Attaching the vibration sensor to the display of the host device, for example, can improve the sensitivity of the sensor in this application.

The detection signal from the bone conduction or vibration sensor can be processed in either an analog or digital VT circuit and if, for example, the signal energy exceeds a certain level it is then used to trigger the ASR part of the host device and may also be used to wake up other components of the device from a low power mode (such as a sleep mode).

Both analog and digital components of the VT circuit that can be designed for ultra-low power. They can operate at relatively low clock frequencies (but sufficient for adequate sampling—for example operating at a sample rate that equals or is slightly about the Nyquist frequency), may include few power consuming components.

Furthermore, when using the vibration sensor, if the detected signal energy exceeds a certain level, it may be used to activate other microphones (such as one or more audio microphones, one or more bone conduction microphone) in the device together with ASR circuit that can accurately process the speech and determine if a certain word or phrase has been spoken. By using the combination of audio microphones and vibration sensor, noise cancellation techniques can additionally be applied to further improve the speech analysis in the presence of high background noise. A variation of this is that the microphone and processing circuitry may be active together and this condition could be selected for selected operational conditions.

FIG. 1 shows a user 10 with a wearable computer which has a head mounted display 12 according to an embodiment of the invention. A bone conduction sensor 11 touches the user's skull for speech vibration capture. The head mounted display 12 may include the VT and ASR circuits (not shown).

Figure 2:
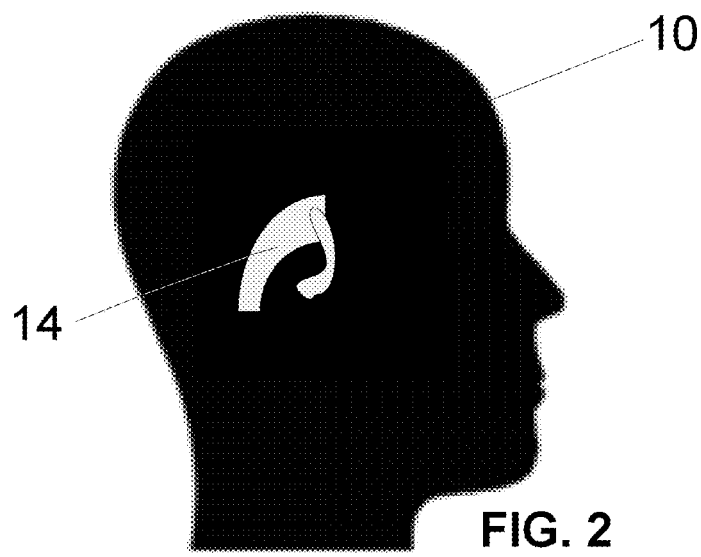
FIG. 2 is a perspective view showing a user wearing a wireless headset such as a Bluetooth headset according to an embodiment of the invention.

FIG. 2 shows a user 10 wearing a wireless headset 14 according to an embodiment of the invention. A bone conduction element is integral to the headset which is worn such that the body of the headset 14 touches the skull of the user and captures the speech vibrations of the user. The headset may include the VT and ASR circuits (not shown).

Figure 3:
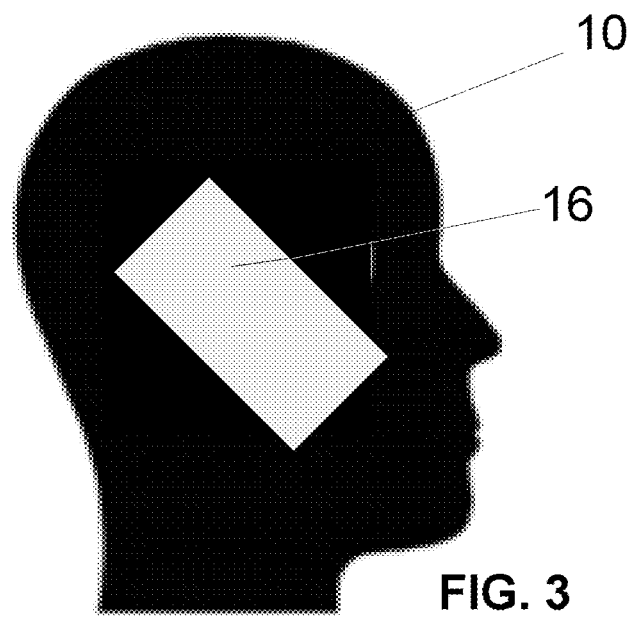
FIG. 3 is a perspective view showing a user with a mobile phone held to the ear according to an embodiment of the invention.

FIG. 3 shows a user 10 holding a mobile phone 16 to the head against the ear and/or face according to an embodiment of the invention. A bone conduction sensor or a vibration sensor acting as a bone conduction element is integral to the phone 16. By touching the phone 16 to the head of the user 10, speech vibrations of the user are captured. To improve the sensitivity of the vibration sensor, it can be mounted behind but attached to the display of the mobile phone. In this case, when the mobile phone is held as shown in FIG. 3, the display touches the skull of the user and the speech vibrations of the user are propagated via the display glass to the vibration sensor. The phone may include the VT and ASR circuits (not shown).

Figure 4:
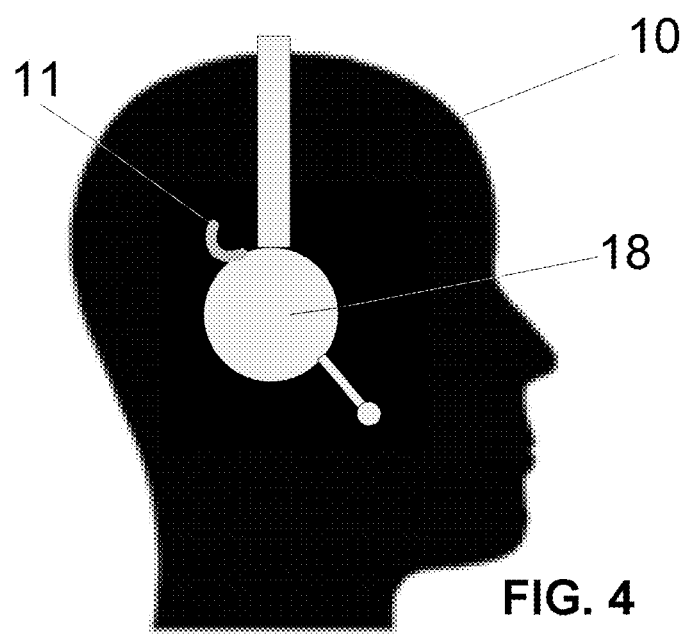
FIG. 4 is a perspective view showing a user wearing wireless headphones according to an embodiment of the invention.

FIG. 4 shows a user 10 wearing wireless headphones and microphone 18 according to an embodiment of the invention. A bone conduction element 11 that touches the user's skin is used for speech vibration capture. The wireless headphones and microphone 18 may include the VT and ASR circuits (not shown).

Figure 5:
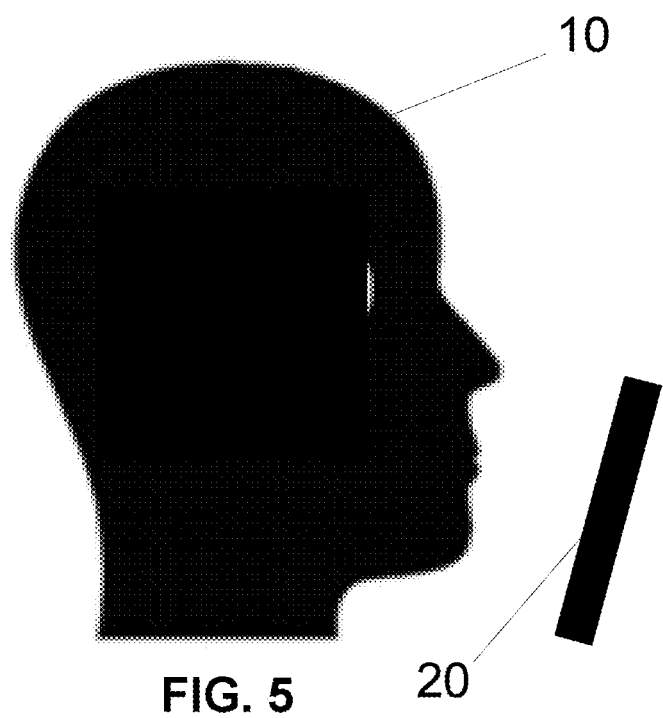
FIG. 5 is a perspective view showing a user holding a mobile phone in front of the mouth according to an embodiment of the invention.

FIG. 5 shows a user 10 holding a mobile phone 20 directly in front of the mouth according to an embodiment of the invention. A vibration sensor, integral to the phone, detects and captures sound pressure vibrations from the user's speech. The sensor can be mounted behind and attached to the display of the mobile phone. When the mobile phone is held as shown in FIG. 5, the sound pressure waves from the user's speech can be detected, via the display glass, by the vibration sensor. The mobile phone 20 may include the VT and ASR circuits (not shown).

FIGS. 1 to 5 are provided as examples and are not intended to be the complete range of uses of the bone conduction sensor or vibration sensor. Such sensors can be fitted to any electronic device that is used for speech.

Figure 6:
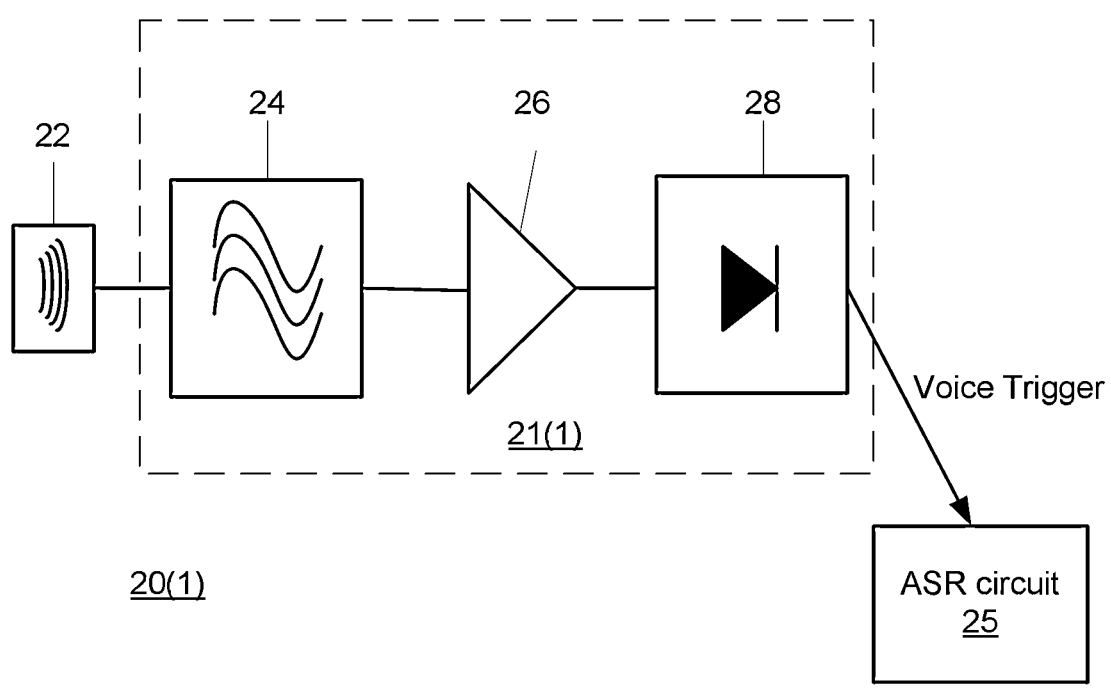
FIG. 6 is a schematic diagram of an example of an analog implementation of a VT circuit using a bone conduction or vibration sensor according to an embodiment of the invention.

FIG. 6 shows an analog implementation of an ultra-low power circuit 20(1) that uses the speech vibrations of the user as shown in the examples FIGS. 1 to 5 according to an embodiment of the invention.

Speech vibrations are detected by a first sensor 22 that may act either as a bone conductor sensor (examples FIGS. 1 to 4) or as a vibration sensor (example FIG. 5. The physical details of the first sensor may vary for the various applications for which it is used.

The desired frequency elements of the first detection signals outputted by the first sensor are filtered and selected by a filter 24. Filter 24 may be a bandpass filter and may include passive components.

The filter 24 is optional but is intended to be used for filtering out unwanted local and environmental noise and selecting the desired speech frequencies.

An amplifier 26 (that may be an ultra-low power amplifier) may amplify filtered signals from filter 24 thereby increasing the detected speech voltage amplitude to levels that enable energy detection.

Amplified signals from amplifier 26 are fed to energy detector 28 (that may include a diode detector and an ultra-low energy voltage comparator). If the energy detected exceeds a certain threshold, then the output from energy detector 28 is used to trigger the ASR circuit that is integral to the device in use.

Filter 24, amplifier 26, and energy detector 28 may form a VT circuit 21(1). The VT circuit 21(1), using the bone conduction or vibration sensor output, can be made such that it will consume ultra-low power in the area of tens of microwatts.

In FIG. 6 a voice trigger (VT) signal is sent from VT circuit 21(1) to ASR circuit 25.

Figure 7:
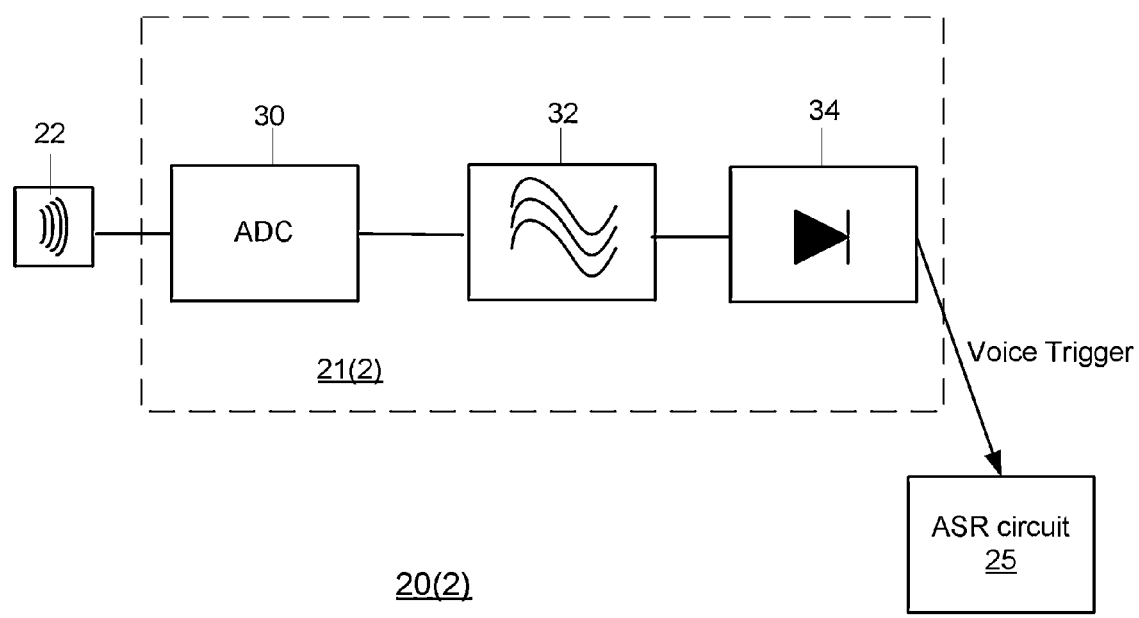
FIG. 7 is a schematic diagram of an example of a digital implementation of a VT circuit using a bone conduction or vibration sensor according to an embodiment of the invention.

FIG. 7 shows a digital implementation of an ultra-low power circuit 20(2) that uses the speech vibrations of the user as shown in the examples FIGS. 1 to 5 according to an embodiment of the invention.

The speech vibration is detected by the first sensor 22, acting either as a bone conductor sensor (examples FIGS. 1 to 4) or as a vibration sensor (example FIG. 5). The physically details of the sensor itself may vary for the various applications for which it may be used.

Digital samples of the first detection signals outputted by the first sensor 22 are produced by analog to digital converter (ADC) 30. These digital samples are then filtered using a digital filter 32 (such as a digital band pass filter) and then passed to the energy detector 34.

ADC 30, filter 32 and energy detector 34 may form a VT circuit 21(2). A digital implementation of the VT circuit 21(2) does not necessarily require digital signal processing and can be designed to use very low power logic. Although this digital implementation may consume more power than the analog implementation FIG. 6, the advantage is that it lends itself to integration and smaller size.

In FIG. 7 a voice trigger (VT) signal is sent from VT circuit 21(2) to ASR circuit 25.

Figure 8:
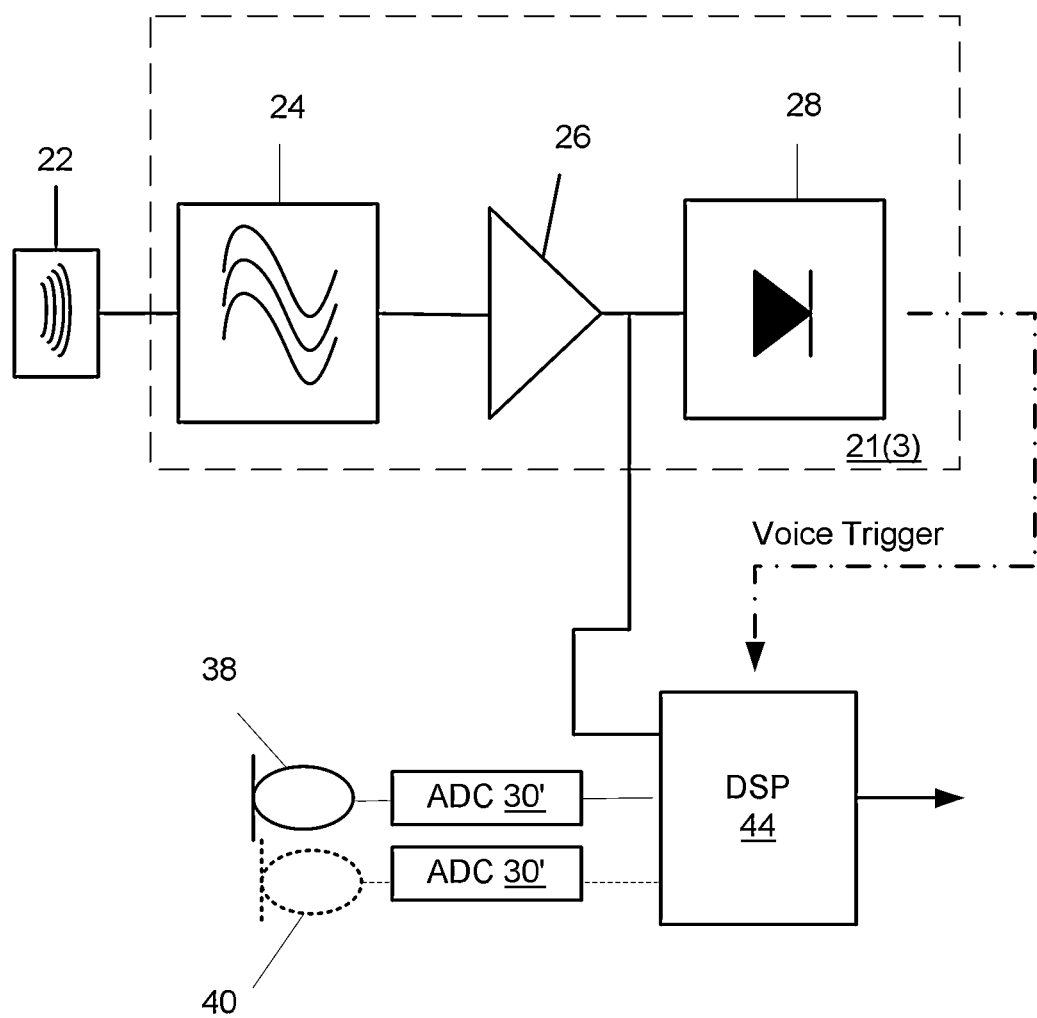
FIG. 8 is a schematic diagram of an example of an analog implementation of a circuit using a vibration sensor used to activate a processing circuit using additional microphone(s) in order to produce the Voice Trigger according to an embodiment of the invention.

FIG. 8 shows an analog implementation, similar to FIG. 6, of an ultra-low power circuit 20(3) that uses the speech vibrations of the user, but where the output from the energy detector 26 is used to power on an ASR circuit 42 such as a digital signal processor (DSP) according to an embodiment of the invention. It is noted that the ASR circuit can be a dedicated hardware and not implemented by a DSP.

In this case the first sensor 22 may be a vibration sensor. FIG. 8 also shows that amplified signals from amplifier 26 are fed to ASR circuit 42 and can be processed during speech recognition.

Figure 9:
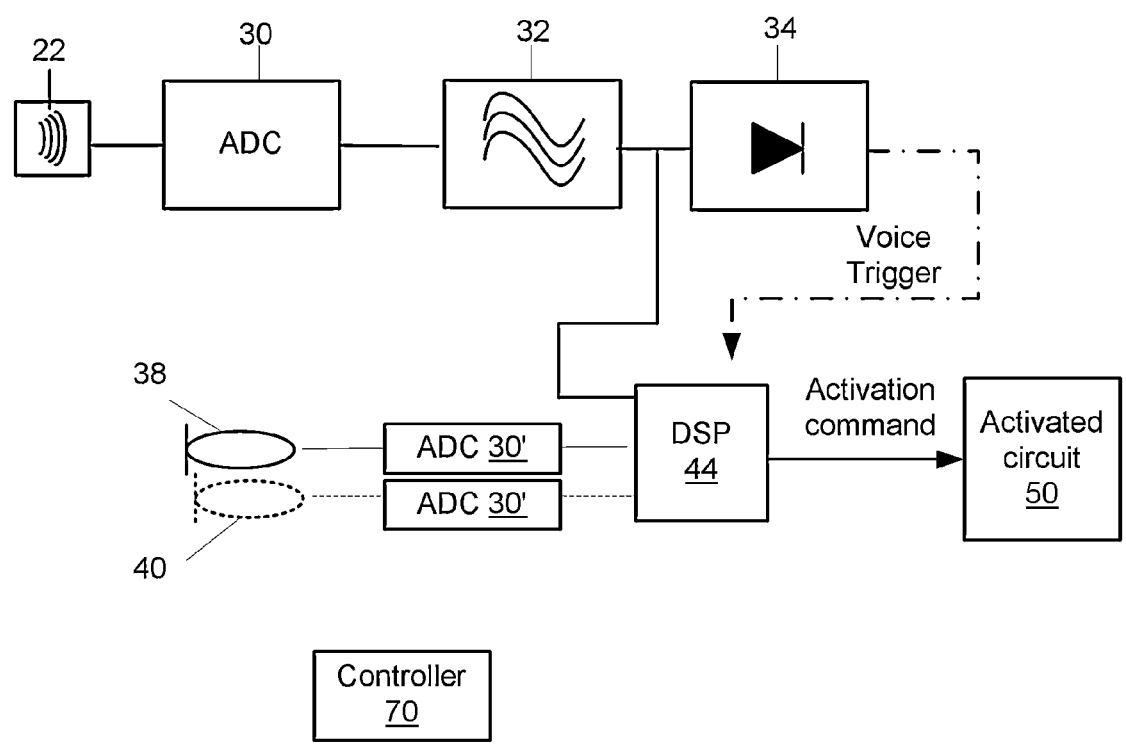
FIG. 9 is a schematic diagram of an example of a digital implementation of a circuit using a vibration sensor used to activate a processing circuit using additional microphone(s) in order to produce the Voice Trigger according to an embodiment of the invention.

FIG. 9 shows a digital implementation, similar to FIG. 7, of a low power circuit 20(4) that uses the speech vibrations of the user, but where the output from the energy detector 34 is used to power on a processing circuit 44 according to an embodiment of the invention.

In this case the first sensor 22 is a vibration sensor. Connected to the processing circuit 42 are one or more microphones 38 and 40. The microphones 38 and 40 may be audio microphones.

Signals outputted by ADC 32 are provided to the ASR circuit 42 (such as but not limited to DSP 42). The output signals 36 from the energy detector 34 power up the ASR circuit 42 immediately when speech energy exceeds a preset threshold. This action is fast and the ASR circuit 42 is activated quickly enough such that enough of the spoken command can be analyzed and recognized. The ASR circuit 42 may be kept low power as it need only detect a restricted range of user input commands, such as wake up calls for various functions within the host device. If the ASR circuit 42, using the inputs from the vibration sensor circuit determines that the speech detected is a predetermined phrase, such as a wake up command, then an output is activated in order to activate the automatic speech recognition circuit such that further spoken instructions can be analyzed.

ADC 30, filter 32 and energy detector 34 may form a VT circuit 21(4).

In FIG. 9 an activation command signal (indicative of a detection of an audio activation command) is sent from DSP 44 to an activated circuit 50. It is noted that such a signal can activate a process, either executed by the digital processor or not.

Figure 10:
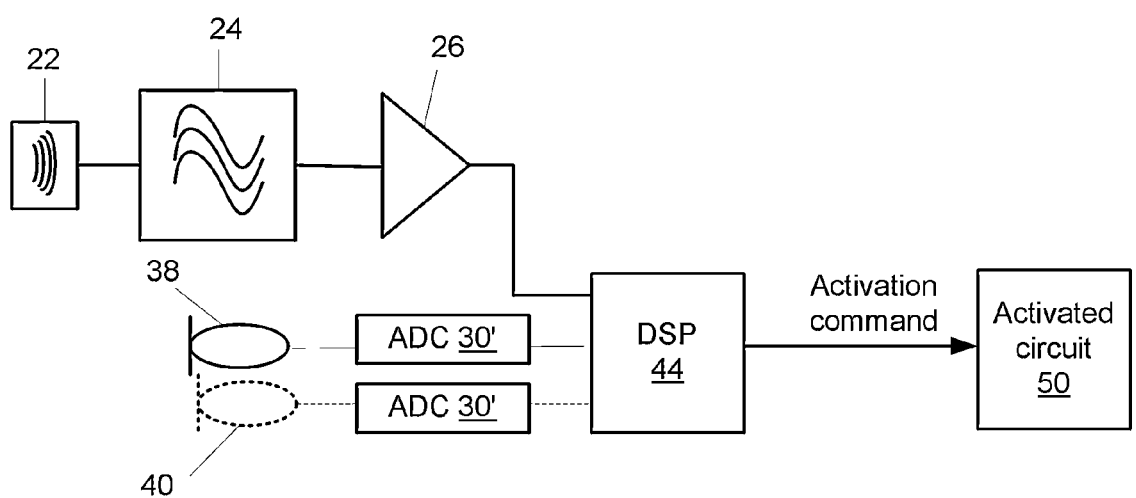
FIG. 10 is a schematic diagram of an example of an analog implementation of a circuit using a vibration sensor used in addition to other microphone(s) in order to produce the Voice Trigger according to an embodiment of the invention.

FIG. 10 shows a voice activated device 20(5) that includes a signal processor 44 (such as DSP), first sensor 22, filter 24 and amplifier 26 and microphones 38 and 40 according to an embodiment of the invention.

The signal processor 44 may participates in VT detection and may output a VT detection signal. According to an embodiment of the invention the signal processor may performs an ASR process. According to another embodiment of the invention the ASR process may be implemented by a circuit that differs from the signal processor 44.

One or more microphones 38 and 40 are connected to the signal processor 44. The signal processor 42 may be kept (until detecting a VT) at a low power mode as it need only detect a restricted range of user input commands, such as wake up calls for various functions within the host device.

If the processing circuit 44, using the inputs from the vibration sensor circuit and the microphones 38 and 40, determines that the speech detected is a predetermined phrase, such as a phrase that may be included in a wake up command, then an output is set in order to activate the automatic speech recognition circuit (or to initiate an ASR process by the signal processor itself) such that further spoken instructions can be analyzed.

In FIG. 10 an activation command signal (indicative of a detection of an audio activation command) is sent from DSP 44 to an activated circuit 50. It is noted that such a signal can activate a process, either executed by the digital processor or not.

Figure 11:
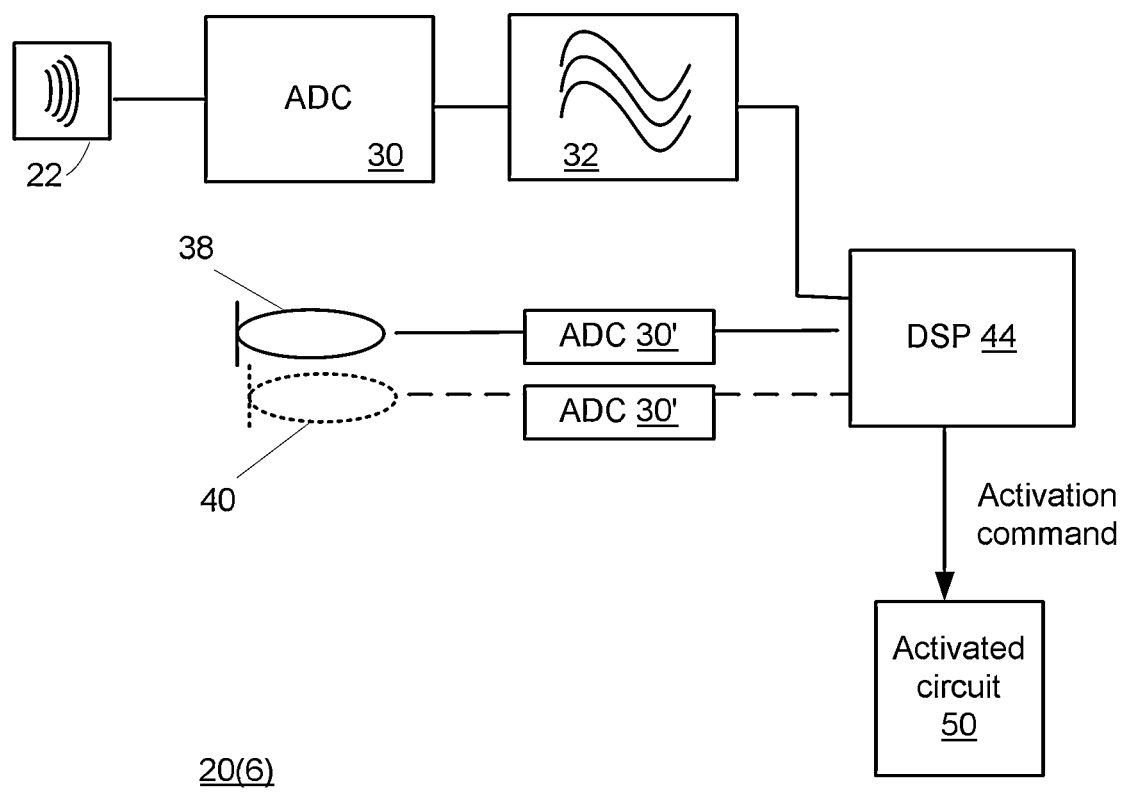
FIG. 11 is a schematic diagram of an example of a digital implementation of a circuit using a vibration sensor used in addition to other microphone(s) in order to produce the Voice Trigger according to an embodiment of the invention.

FIG. 11 shows a voice activated device 20(6) that includes a signal processor 44 (such as DSP), first sensor 22, ADC 30, filter 32 and microphones 38 and 40 according to an embodiment of the invention.

Voice activated device 20(6) of FIG. 11 differs from voice activated device 20(5) of FIG. 10 by having a digital detection path that include ADC 24 and filter 32 instead of filter 24 and amplifier 28.

In FIG. 11 an activation command signal (indicative of a detection of an audio activation command) is sent from DSP 44 to an activated circuit 50. It is noted that such a signal can activate a process, either executed by the digital processor or not.

According to an embodiment of the invention buffering may be used for buffering detection signals from the first detector and/or an audio detector before the ASR circuit is triggered. The detection signals may be the output of a VT circuit or any signals generated by any components (filter, amplifier, ADC, power detector) of the VT circuit.

The ASR circuit may then fetch and process the detection signals in order to apply the ASR process even on sound signals detected before it (the ASR circuit) was triggered. This can assist in detecting voice activation commands that were started before the ASR circuit was triggered. Typically the buffer can store detection signals for a period that will suffice to detect one or more syllables. Sampling rate of few tens of kilohertz per second may be applied (for example 40 Khz) and the delay provided by the buffer may be 100 Milliseconds, more than 100 Millisecond or less than 100 Millisecond.

According to an embodiment of the invention there may be provided one or more buffers for buffering detection signals from one or more VT circuits, for one or more pre-processors (such as samplers, ADC circuits and the like) and/or from one or more sensor such as a bone conduction sensor, a vibration sensor, audio sensor and the like.

Figure 12:
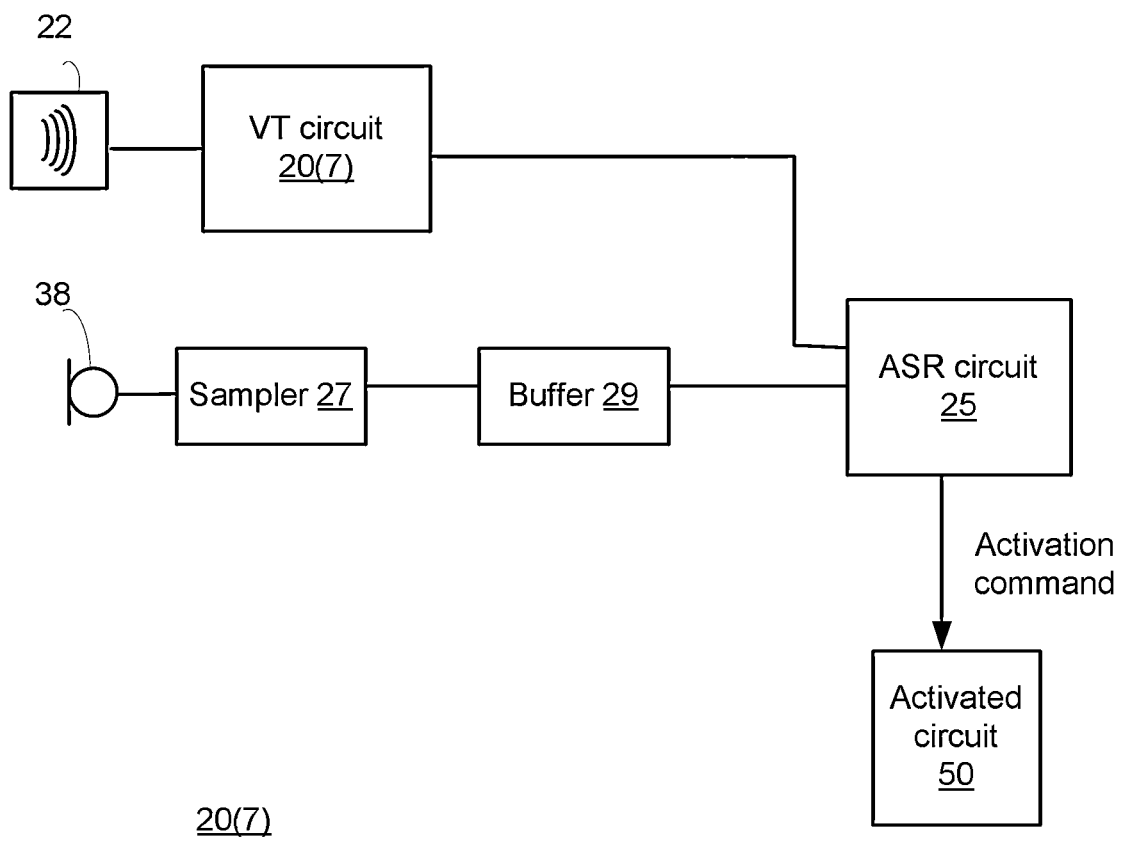
FIG. 12 illustrates a voice activated device according to an embodiment of the invention.

FIG. 12 illustrates a voice activated device 20(7) according to an embodiment of the invention.

The voice activated device 20(7) includes a VT circuit 21(7) that is fed by a first sensor 22 such as a vibration sensor or a bone conduction sensor, an audio microphone 38, a sampler 27 for sampling the outputs signals of the audio microphone 38, a buffer 29 for storing the samples from sampler 27 and a ASR circuit 25. Once the ASR circuit 25 is triggered it may retrieve buffers samples. The samples may be fed to the buffer even after the ASR circuit 25 is triggered.

According to another embodiment of the invention signals from the VT circuit 21(7) or the first sensor 22 may be buffered by a buffer and the ASR circuit 25 may be arranged to apply and ASR process based on these signals.

Figure 13:
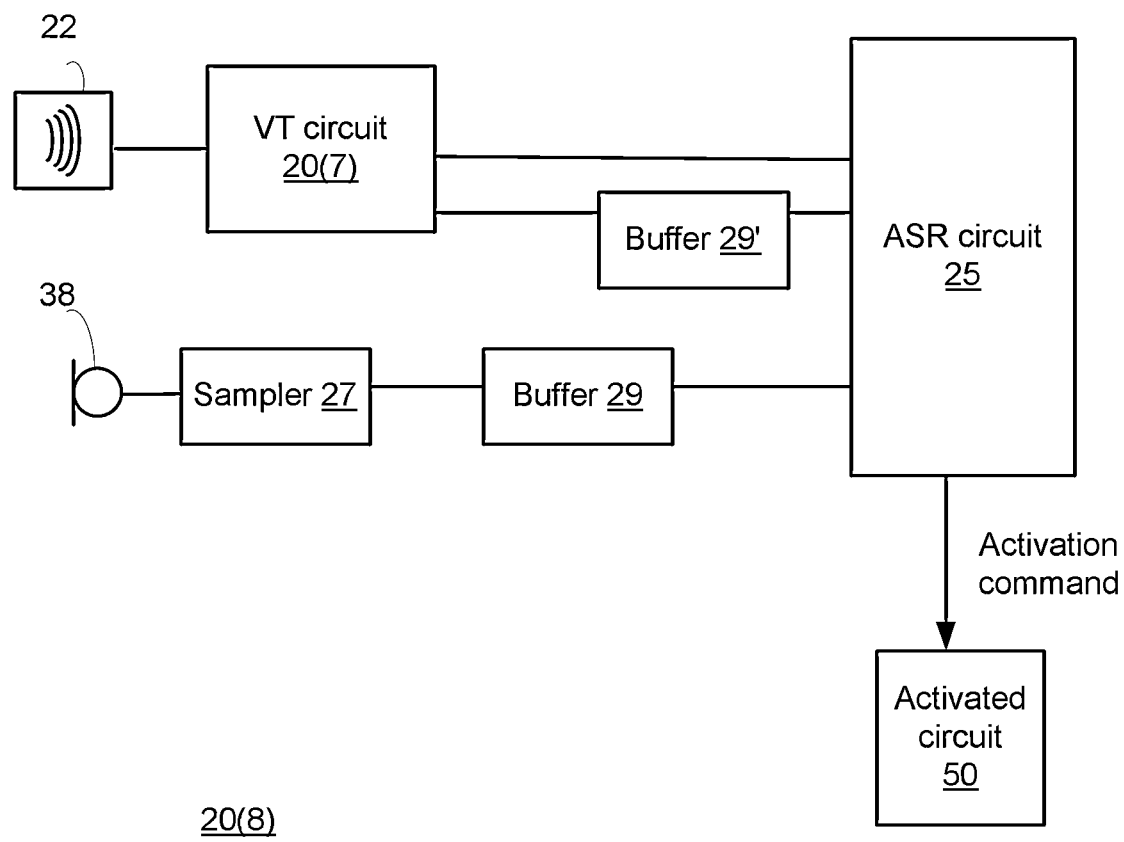
FIG. 13 illustrates a voice activated device according to an embodiment of the invention.

FIG. 13 illustrates a voice activated device 20(8) according to an embodiment of the invention.

The voice activated device 20(8) of FIG. 13 differs from the voice activated device 20(7) of FIG. 12 by illustrating a second buffer 29' for buffering signals from VT circuit 21(7).

Figure 14:
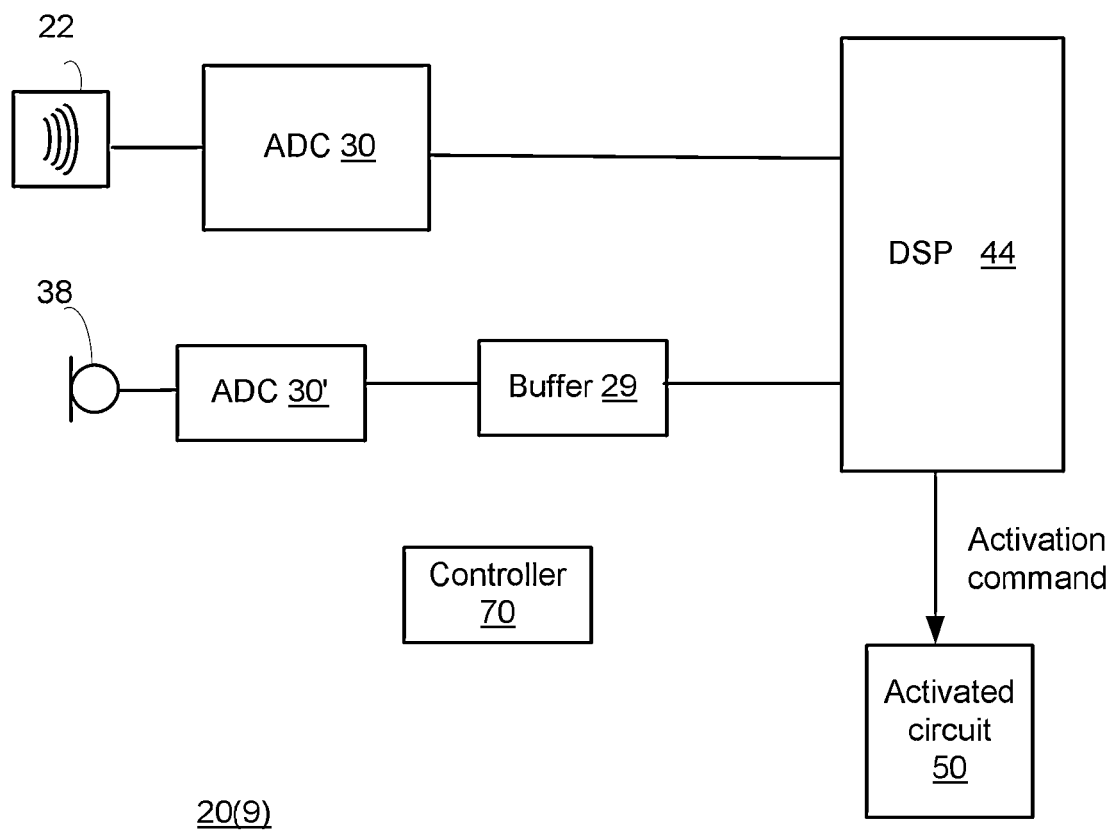
FIG. 14 illustrates a voice activated device according to an embodiment of the invention.

FIG. 14 illustrates a voice activated device 20(9) according to an embodiment of the invention.

The voice activated device 20(8) of FIG. 14 includes first sensor 22, ADC 30, audio sensor 38, second ADC 30', buffer 29, a signal processor 44 (such as DSP), activated circuit 50.

First detection signals from first sensor 22 and converted to digital signals by ADC 30 that sends digital signals to the signal processor that applies a VT process.

Audio samples from audio sensor 38 are fed to second ADC 30' that sends digital signals to buffer 29. Audio samples may be any type of representation of the audio received by the audio sensor 38.

The signal processor 44 may fetch the buffered signals from buffer 30, when triggered to do so—after detecting a voice trigger.

The signal processor 44 may activate an activated circuit 50 or an activated process or both.

FIG. 14 also shows a controller 70. Controller 70 may be arranged to control the voice activated circuit. It may, for example, determine if digital signals from second ADC 30' should be fed to the signal processor 44 even during a VT process. It can set operation parameters of the signal processor 44. The controller can be included in any of the voice activated devise illustrated in FIGS. 6-13.

The signal processor 44 may perform the VT process when operating in a first power mode in which the signals processor is almost idle—it may consume a relatively low amount of power and consume a relatively low amount of MIPs. When performing the ASR process the MIPS consumed and the power consumption may dramatically increase. For example—VT may consume 0.15 MIPS while ASR may consume 8 MIPS.

The signal processor may operate at different frequencies (different clock rates) when performing VT and ASR.

Figure 15:
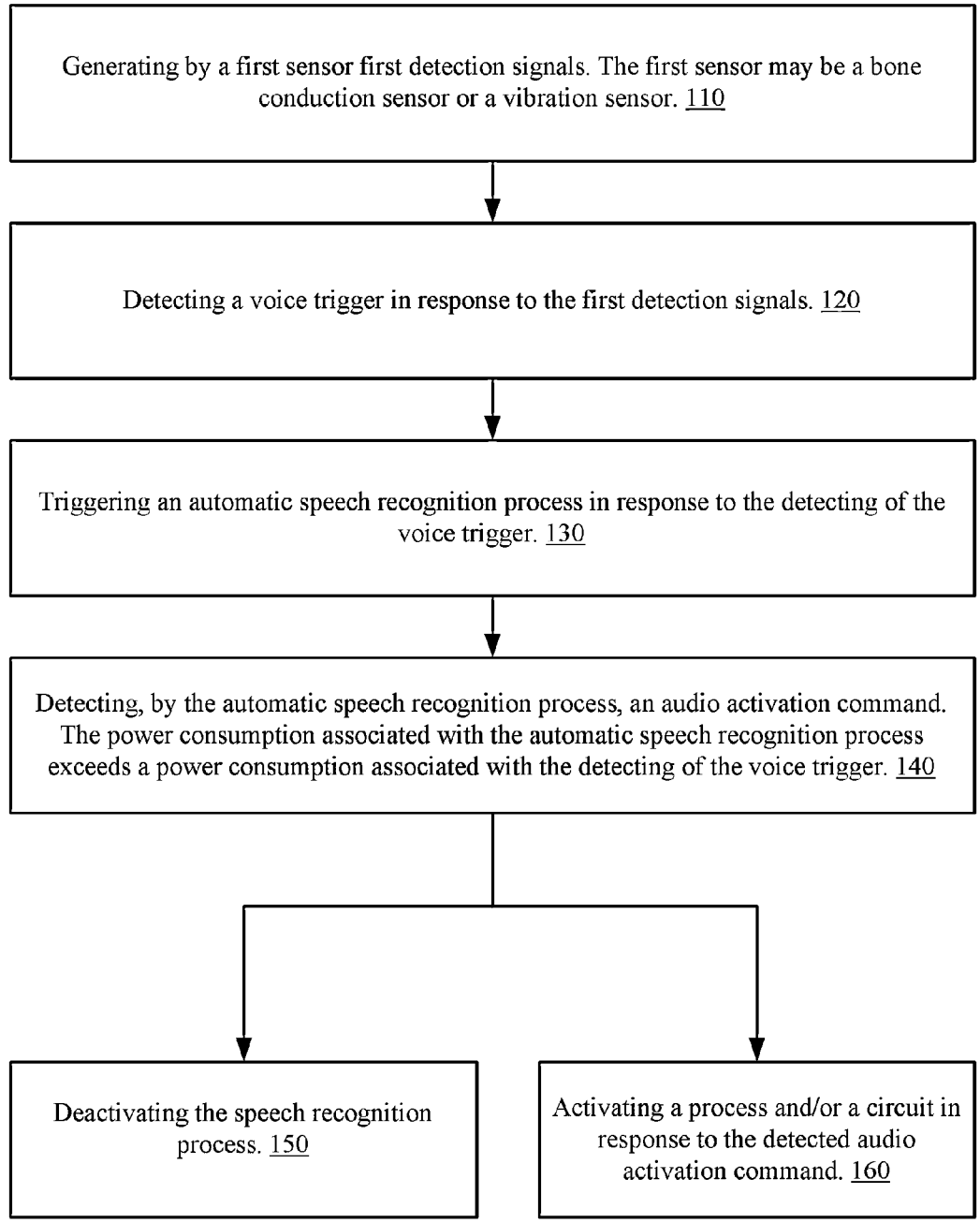
FIG. 15 illustrates a method according to an embodiment of the invention.

FIG. 15 illustrates a method 100 according to an embodiment of the invention.

Method 100 may start by stage 110 of generating by a first sensor first detection signals. The first sensor may be a bone conduction sensor or a vibration sensor.

Stage 110 may be followed by stage 120 of detecting a voice trigger in response to the first detection signals.

Stage 120 may be followed by stage 130 of triggering an automatic speech recognition process in response to the detecting of the voice trigger.

Stage 130 may be followed by stage 140 of detecting, by the automatic speech recognition process, an audio activation command. The power consumption associated with the automatic speech recognition process exceeds a power consumption associated with the detecting of the voice trigger.

Stage 140 may be followed by stages 150 and 160.

Stage 150 may include deactivating the speech recognition process.

Stage 160 may include activating a process and/or a circuit in response to the detected audio activation command.

Method 100 may be executed by any of the one of the voice activated devices of any of the previous figures.

For example stage 120 may be executed by a voice trigger circuit while an ASR circuit is at a first power mode. Stage 140 may be executed by an automatic speech recognition circuit when operating in a second power mode. A power consumption of the automatic speech recognition circuit when operating in the second power mode exceeds a power consumption of the automatic speech recognition when operating in the first power mode.

Figure 16:
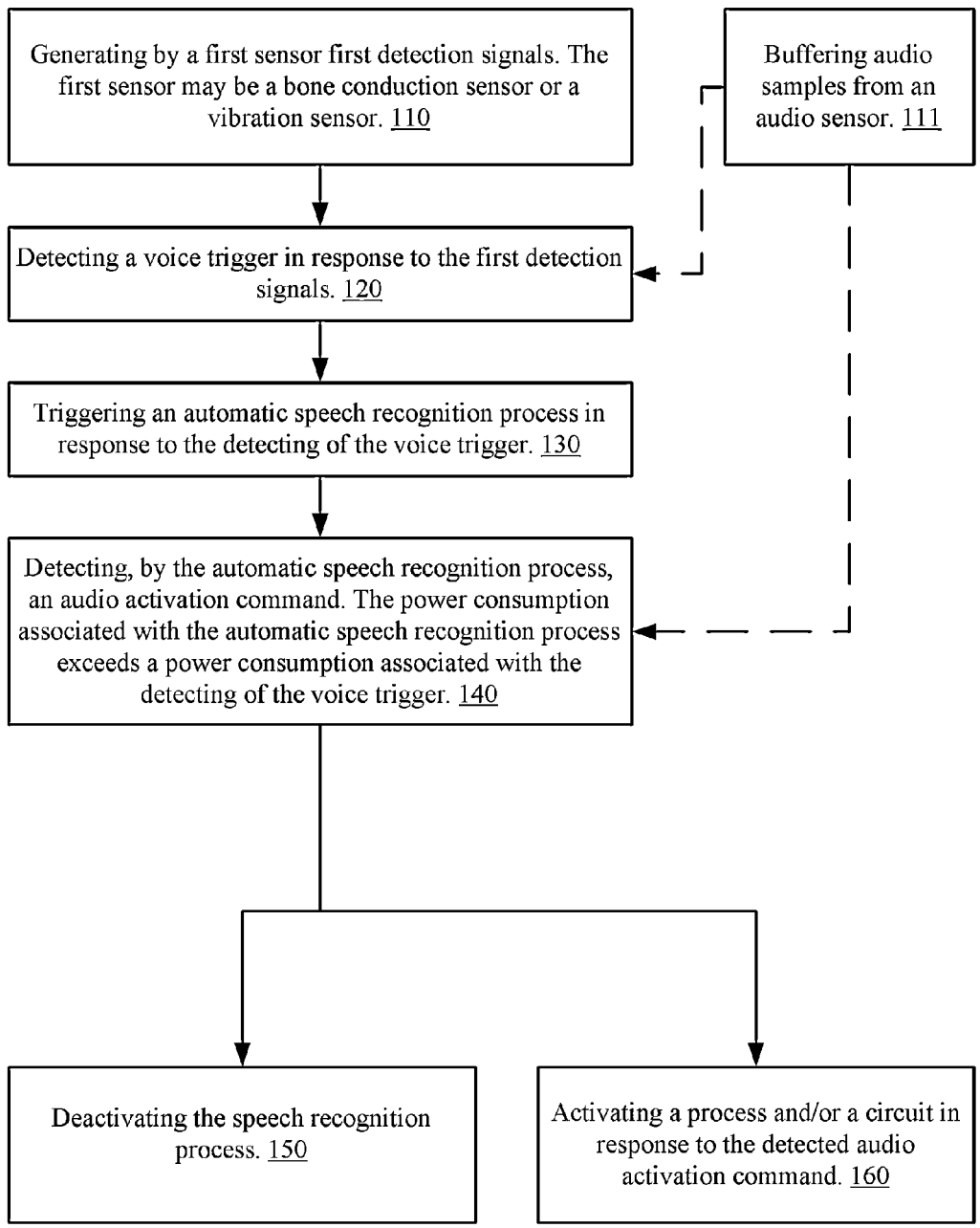
FIG. 16 illustrates a method according to an embodiment of the invention.

FIG. 16 illustrates a method 101 according to an embodiment of the invention.

Method 101 may differ from method 100 by including stage 111.

Method 101 may start by stage 111 and 110. Stage 111 includes buffering audio samples from an audio sensor. The audio samples may be buffered even before the beginning of stage 140. Therefore at least some audio samples are buffered prior to the triggering of the automatic speech recognition process.

Stage 140 of detecting the audio activation command may be responsive to the buffered audio samples.

Figure 17:
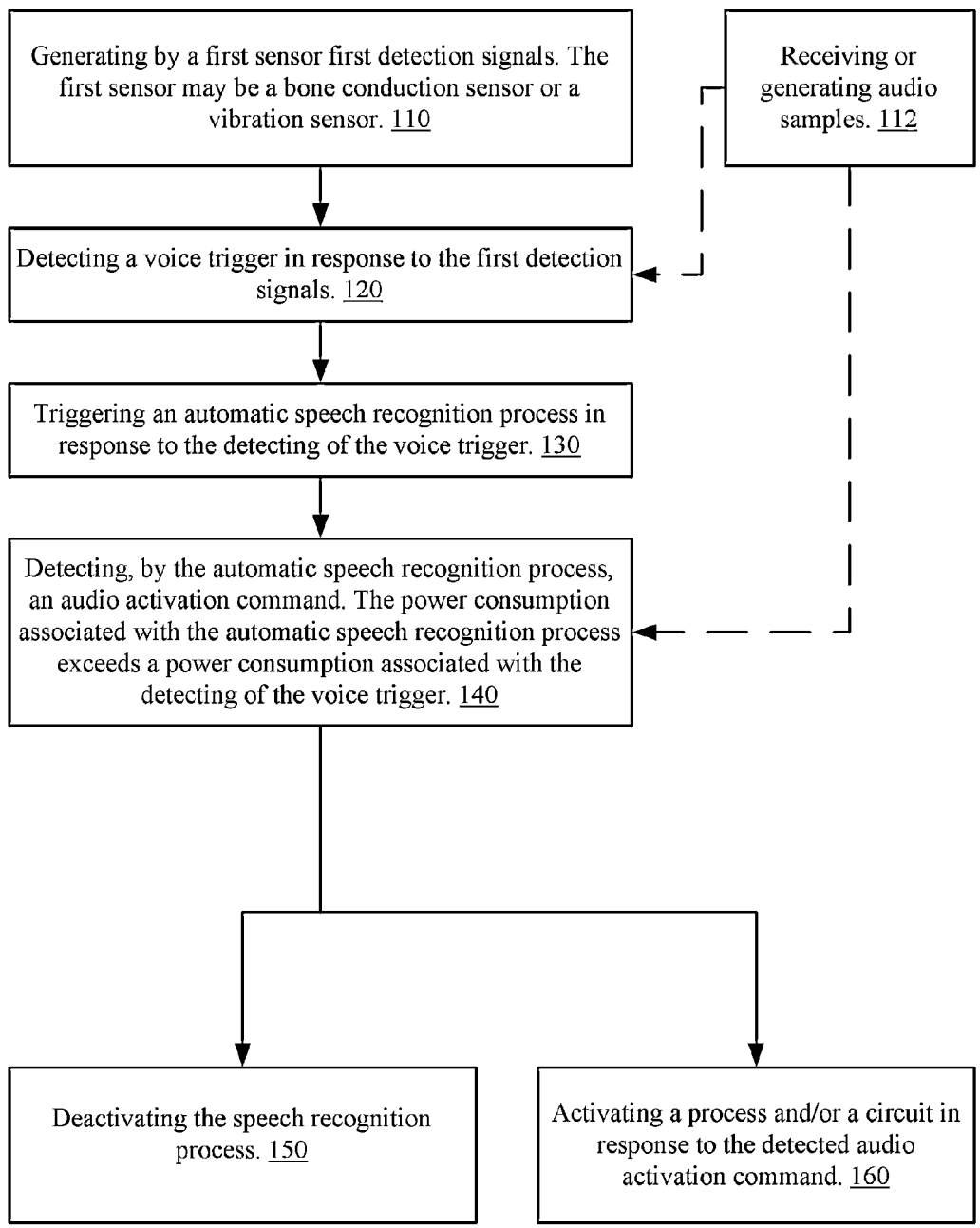
FIG. 17 illustrates a method according to an embodiment of the invention.

FIG. 17 illustrates a method 102 according to an embodiment of the invention.

Method 102 may differs from method 100 by including stage 112 of receiving or generating audio samples. The audio samples may be used during stage 120 and/or during stage 140—as illustrated by dashed lines connecting box 112 to boxes 120 and 140.

Stage 120 may include, for example, generating and/or processing of the audio samples in parallel to the generating and/or processing of the first detection signals. Alternatively—the generating and/or processing of the audio samples can follow the generating and/or processing of the first detection signals. For example, a voice trigger circuit may be arranged to activate an audio sensor if the first detection signals are indicative of a potential issuance of a voice trigger; and to verify the voice trigger if audio samples generated by the audio sensor are indicative of the voice trigger.

| REFERENCE NUMERALS IN THE DRAWINGS | | | |
|---|---|---|---|
| 10 | User | 11 | Bone Conduction element |
| 12 | Wearable computer with head mounted display | | |
| 14 | Wireless headset | 16 | Mobile Phone held to the ear |
| 18 | Wireless Headphones | 20 | Mobile Phone held in front of mouth |
| 21(1)-21(7) | Voice trigger circuits | | |
| 22 | Sensor block | 23 | Vibration Sensor |
| 24 | Analog Band pass Filter block | | |
| 25 | ASR circuit | 26 | Amplifier block |
| 27 | Sampler | 28 | Energy detector |
| 30, 30' | ADC | | |
| 32 | Band pass filter for digital circuit | 34 | Energy detector for digital circuit |
| 36 | Power supply trigger | 38 | Microphone |
| 40 | Additional microphone | 42 | Speech Processing circuit |
| 44 | Signal Processor (DSP) | 50 | Activated circuit |
| 70 | Controller | | |

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A voice activated device, comprising:
    a voice trigger circuit,
    an automatic speech recognition circuit;
    a controller;
    a set of detectors;
    wherein the voice trigger circuit is arranged to receive first detection signals from a first sensor of the set of detectors and to trigger an activation of the automatic speech recognition circuit in response to a detection of a voice trigger, while the automatic speech recognition device is in a first power mode;
    wherein the automatic speech recognition circuit is arranged to detect, while operating in a second power mode, an audio activation command;
    wherein a power consumption of the automatic speech recognition circuit when operating in the second power mode exceeds a power consumption of the automatic speech recognition when operating in the first power mode;
    wherein the first sensor is a bone conduction sensor or a vibration sensor; and
    wherein the controller is arranged to determine which sub-set of detectors to activate when the automatic speech recognition device is in the first power mode, in response to previous voice trigger detections and automatic speech recognition detections; wherein the sub-set of detectors belongs to the set of detectors.

2. The voice activated device according to claim 1 the automatic speech recognition is arranged to be idle or deactivated when in the first power mode.

3. The voice activated device according to claim 1 comprising a display, wherein the first sensor is a vibration sensor that is connected to the display.

4. The voice activated device according to claim 1 comprising a buffer that is arranged to receive audio samples from an audio sensor and to store the audio samples, wherein the automatic speech recognition circuit, after being activated, is arranged to retrieve the audio samples; wherein at least some audio samples are received by the buffer when the automatic speech recognition device is in the first power mode.

5. The voice activated device according to claim 4 wherein the voice activated device comprises the audio sensor.

6. The voice activated device according to claim 1, wherein the automatic speech recognition circuit is arranged to detect the audio activation command in response to audio samples provided by an audio sensor and in response to the first detection signals.

7. The voice activated device according to claim 1, wherein the voice trigger circuit is further arranged to receive audio samples from an audio sensor and to detect the voice trigger in response to the first detection signals and the audio samples.

8. The voice activated device according to claim 1, wherein the voice trigger circuit is arranged to activate an audio sensor if the first detection signals are indicative of a potential voice trigger; and to verify the voice trigger if audio samples generated by the audio sensor are indicative of the voice trigger.

9. The voice activated device according to claim 1 wherein the set of detectors comprises the vibration sensor and the bone conduction sensor.

10. The voice activated device according to claim 1 wherein the controller is arranged to determine which sub-set of detectors to activate also when the automatic speech recognition device is in the first power mode, in response to an expected power consumption associated with an activation of the sub-set of detectors.

11. The voice activated device according to claim 1, wherein the voice trigger circuit is further arranged to receive audio samples from an audio sensor and to detect the voice trigger in response to the first detection signals and the audio samples.

12. The voice activated device according to claim 1, wherein the voice trigger circuit is arranged to activate an audio sensor if the first detection signals are indicative of a potential issuance of a voice trigger; and to verify the voice trigger if audio samples generated by the audio sensor are indicative of the voice trigger.

13. A method for activating a voice activated device, the method comprises:

determining which sub-set of detectors to activate when an automatic speech recognition process is deactivated in response to previous voice trigger detections and automatic speech recognition detections; wherein the sub-set of detectors belongs to a set of detectors;

generating, by a first sensor of the set of detectors, first detection signals; wherein the first sensor is a bone conduction sensor or a vibration sensor;

detecting a voice trigger in response to the first detection signals;

triggering the automatic speech recognition process in response to the detecting of the voice trigger; and detecting, by the automatic speech recognition process, an audio activation command; and deactivating the speech recognition process;

wherein power consumption associated with the automatic speech recognition process exceeds a power consumption associated with the detecting of the voice trigger.

14. The method according to claim 13 comprising buffering audio samples from an audio sensor; wherein at least some audio samples are buffer prior to the triggering of the automatic speech recognition process; and processing the audio samples by the automatic speech recognition process.

15. The method according to claim 13 wherein the automatic speech recognition process is responsive to audio samples provided by an audio sensor and to the first detection signals.

* * * * *